United States Patent [19]
Hadgis

[11] Patent Number: 5,394,482
[45] Date of Patent: Feb. 28, 1995

[54] METHOD AND APPARATUS FOR THE DETECTION OF DOT-MATRIX PRINTED TEXT SO AS TO IMPROVE OPTICAL CHARACTER RECOGNITION

[75] Inventor: George A. Hadgis, Rochester, N.Y.

[73] Assignee: Eastman Kodak Company, Rochester, N.Y.

[21] Appl. No.: 177,294

[22] Filed: Jan. 4, 1994

Related U.S. Application Data

[63] Continuation of Ser. No. 786,474, Nov. 1, 1991, abandoned.

[51] Int. Cl.⁶ ............................................. G06K 9/00
[52] U.S. Cl. ............................................. 382/9; 382/27; 382/48
[58] Field of Search .............. 382/9, 21, 25, 27, 48, 382/54

[56] References Cited

U.S. PATENT DOCUMENTS

| | | | |
|---|---|---|---|
| H681 | 9/1989 | Weidman | 382/11 |
| 3,634,822 | 1/1972 | Chow | 340/146.3 S |
| 3,737,855 | 6/1973 | Cutaia | 340/146.3 AG |
| 3,764,980 | 10/1973 | Dansac et al. | 340/146.3 ED |
| 4,163,213 | 7/1979 | Nadler | 340/146.3 D |
| 4,263,504 | 4/1981 | Thomas | 235/454 |
| 4,274,079 | 6/1981 | Todd et al. | 340/146.3 FT |
| 4,339,209 | 7/1982 | Tanigami | 400/142 |
| 4,484,068 | 11/1984 | Mazumder | 235/462 |
| 4,528,692 | 7/1985 | Umeda et al. | 382/9 |
| 4,559,644 | 12/1985 | Kataoka et al. | 382/9 |
| 4,561,022 | 12/1985 | Bayer | 358/167 |
| 4,680,805 | 7/1987 | Scott | 382/22 |
| 4,691,366 | 9/1987 | Fenster et al. | 382/54 |
| 4,910,787 | 3/1990 | Umeda et al. | 382/25 |
| 5,025,481 | 6/1991 | Ohuchi | 382/53 |
| 5,109,432 | 4/1992 | Hori et al. | 381/30 |
| 5,182,778 | 1/1993 | Rudack et al. | 382/54 |
| 5,212,741 | 5/1993 | Barski et al. | 382/51 |

FOREIGN PATENT DOCUMENTS

| 57-29186 | 2/1982 | Japan | G06K 9/34 |
| 62-133585 | 6/1987 | Japan | G06K 9/34 |

*Primary Examiner*—David K. Moore
*Assistant Examiner*—Andrew W. Johns
*Attorney, Agent, or Firm*—Dennis R. Arndt

[57] ABSTRACT

The present method and apparatus can be used to detect dot-matrix printed text in a binary digital image and create a filter mask indicating the locations of dot-matrix printed text in the digital image. The serial image data output of the scanning device can be processed at the full data rate of said scanning device.

4 Claims, 10 Drawing Sheets

METHOD AND APPARATUS FOR THE DETECTION OF DOT-MATRIX PRINTED TEXT SO AS TO IMPROVE OPTICAL CHARACTER RECOGNITION

This is a continuation of application Ser. No. 786,474, filed Nov. 01, 1991, abandoned.

CROSS-REFERENCE TO RELATED APPLICATIONS

Reference is made herein to commonly assigned, copending U.S. patent application Ser. No. 07/786,476, entitled METHOD AND APPARATUS FOR LOCATING AND FILTERING DOT-MATRIX VIDEO FOR IMPROVED OPTICAL CHARACTER RECOGNITION, in the name of G. Hadgis, filed concurrently herewith.

TECHNICAL FIELD

The present invention relates to the automatic detection of dot-matrix printed text within a binary digital image. Specifically, neighborhoods of pixels are evaluated within a given binary digital image and a filter mask is thus created indicating the regions where dot-matrix printed text has been detected.

BACKGROUND OF THE INVENTION

Optical Character Recognition (OCR) algorithms currently are being used in a wide variety of applications for converting digitized image data of characters to their ASCII equivalents. This is especially useful in data entry applications where thousands of documents are processed daily. For example, in processing health claim forms, many insurance carriers currently enter the data into their data base via data entry personnel. By taking advantage of OCR, the data can be entered into a data base more accurately and with a higher throughput, thereby reducing the associated costs.

OCR is especially applicable for typewritten fonts such as Gothic or courier. OCR readability of these types of fonts is quite good. However, in the health insurance industry mentioned above, claim forms are received from many different sources. Some of these forms may be filled out using a typewriter, some may be filled out by hand, while others may be done on a dot-matrix printer. Sorting of these incoming documents allows the insurance carrier to use an OCR device to read the typewritten documents and manual data entry for the hand-printed documents. However, dot-matrix documents pose a bit of a problem, since they are machine generated (not as easy to sort as typed vs. hand-printed) but the quality of print generates lower OCR read rates (and therefore more manual data entry to fix the mistakes).

Recognition rates for typewritten text are quite good due to the consistent quality of the print. For example, a gothic letter "S" is very similar to a courier "S", yet either "S" is easily distinguishable from a number "5". Although dot-matrix characters of different printers also look similar, there is less information to distinguish a "5" from an "S". This is especially true for 9 pin draft-quality dot-matrix—typical of less expensive printers. The individual dots forming the characters tend to confuse OCR algorithms that haven't been specifically developed for dot-matrix printed text, thereby reducing accuracy.

OCR algorithms intended for use on continuous fonts, such as those obtained from a typewriter, recognize the characters much more accurately than those obtained from dot-matrix printers. It has been shown that read rates for dot-matrix printed text can be increased by improving (or filtering) the image data as described in U.S. Pat. No. 5,182,778. Unfortunately, the use of such a filter requires the user to separate the dot-matrix printed documents from the typewritten documents since the filter distorts typewritten text images beyond acceptable recognition by the OCR algorithm. Another disadvantage is that the video information to be "read" by the OCR algorithm for a given document must all be of the same type (i.e. either dot-matrix printed text or typewritten text but not both). For these reasons, it is necessary to distinguish dot-matrix printed text from typewritten text.

In the invention of William E. Weideman, U.S. Statutory Invention Registration No. H681, an invention is presented which detects the presence of dot-matrix printed text. However, in this invention, it is assumed that grey-scale image data is available for use by the low-pass and high-pass filters. In systems where only binary image data is available, this algorithm would not work. The present invention, on the other hand, has been specifically developed to handle the case of binary image data.

In the invention of Chao K. Chow, U.S. Pat. No. 3,634,822, detects the presence of dot-matrix text assuming that the individual character images have already been separated. It then computes the probability that a given character belongs to a given font style by comparing the unknown character representation to known character representations of three fonts using style determination functions. It does not examine regions of a document image data, but rather examines individual character image data after separation. The present invention does not function based on probability nor individual separated character image data, but rather examines the entire image data set for certain characteristics to be described later.

Still another invention by Robert Todd et al, U.S. Pat. No. 4,274,079, presents a method whereby a switch character is used in the actual print string to flag when a change of font will occur. The present invention does not require a switch character and will automatically indicate when a different font, specifically, dot-matrix is present.

The current invention uses certain characteristics of dot-matrix printed text. Based on these characteristics, a neighborhood of pixels is flagged as containing dot-matrix printed text. Similarly, all neighborhoods of pixels within the image are evaluated and a temporary map (referred to as a filter mask) is created indicating which neighborhoods of pixels contain dot-matrix text. Given the filter mask, a control system can then be used to decide whether a given neighborhood of pixels should be processed by the algorithm, or some similar method as described in the previously cited reference.

As a result, only those areas within the given image that have been determined to contain dot-matrix printed text are enhanced for improved optical character recognition. Furthermore, the algorithm is capable of operating on said image at the full data rate (real-time, on-line processing) of the scanning device output when implemented in hardware.

SUMMARY OF THE INVENTION

The object of the present invention is to process the video image data of characters of both typewritten and dot-matrix printed text so that the dot-matrix text can be accurately identified. The method and apparatus used to perform such a function requires that an M×N kernal of binary pixels (also referred to as region or neighborhood) be processed and based on certain characteristics, identify or flag when dot-matrix printed text is present within the current M×N kernel. This M×N kernel is scanned across the entire image, one pixel position at a time until the entire image has been processed, thus creating a filter mask which indicates regions where dot-matrix printed text is present on a given document.

Another objective of the present invention is to perform the above mentioned task without the need for storing the complete image in a memory device but rather only store as much of the image as is needed to perform the task on each region of the image.

It is still another objective of the present invention to process the image data as described above without any reduction in throughput of the image data as it is passed from the scanning device to the OCR device's memory section. Accordingly, the apparatus is capable of processing the serial video image data from the scanning device at the full data rate of said scanning device.

BRIEF DESCRIPTION OF THE DRAWINGS

The invention may be understood by reference to the accompanying drawings of which.

MODES OF CARRYING OUT THE INVENTION

Figure 1A:
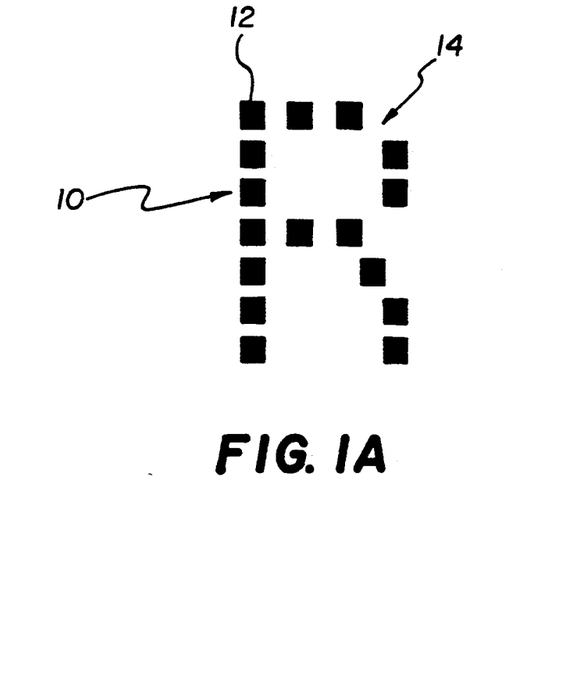
FIG. 1A is an illustration of the bit-map of a 9-pin dot-matrix printed "R"
Figure 1B:
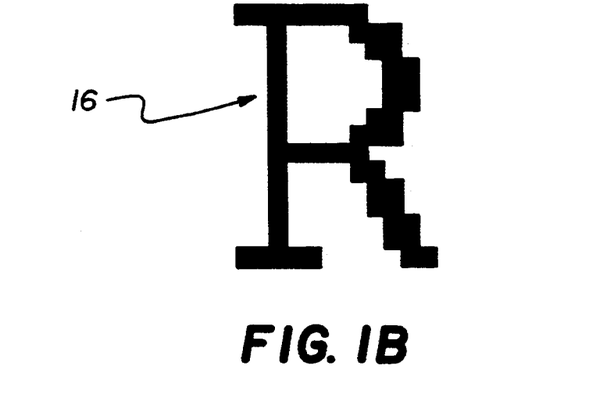
FIG. 1B is an illustration of a bit-map of a typewritten letter "R"

The one characteristic that identifies a dot-matrix printed character from a typewritten character is the inherent discontinuities. Referring to FIG. 1A, it can be seen that a dot-matrix printed letter "R" 10 is comprised of individual dots 12 and spaces (discontinuities) 14. FIG. 1B is the bit-map of a typewritten letter "R" 16 (note that this type of character lacks the discontinuities 14 found in FIG. 1A). By eliminating the discontinuities 14 of the dot-matrix printed text 10, the OCR algorithm is supplied with additional information improving character recognition.

Figure 2:
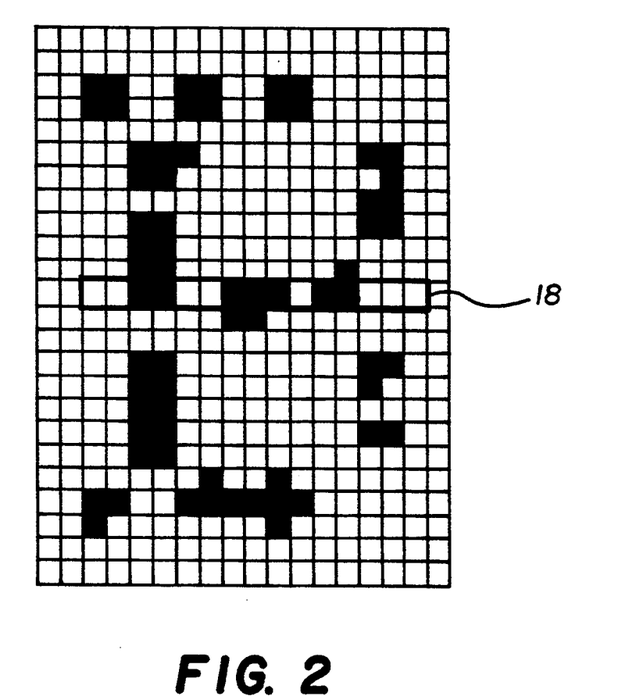
FIG. 2 is actual bit-mapped video data of a 9-pin dot-matrix printed letter "B" scanned at 200 dots per inch.

The principle behind detecting dot-matrix printed text is to process the bit-mapped image data of a character and search for the inherent discontinuities. FIG. 2 is actual video data of a dot-matrix printed letter 'B' scanned at 200 DPI. The highlighted box 18 contains a particular bit-pattern. In fact, if one examines many different sequences of pixels in the horizontal, vertical, and left- and right-diagonal directions, bit-patterns similar to this one can be identified.

Figure 3:
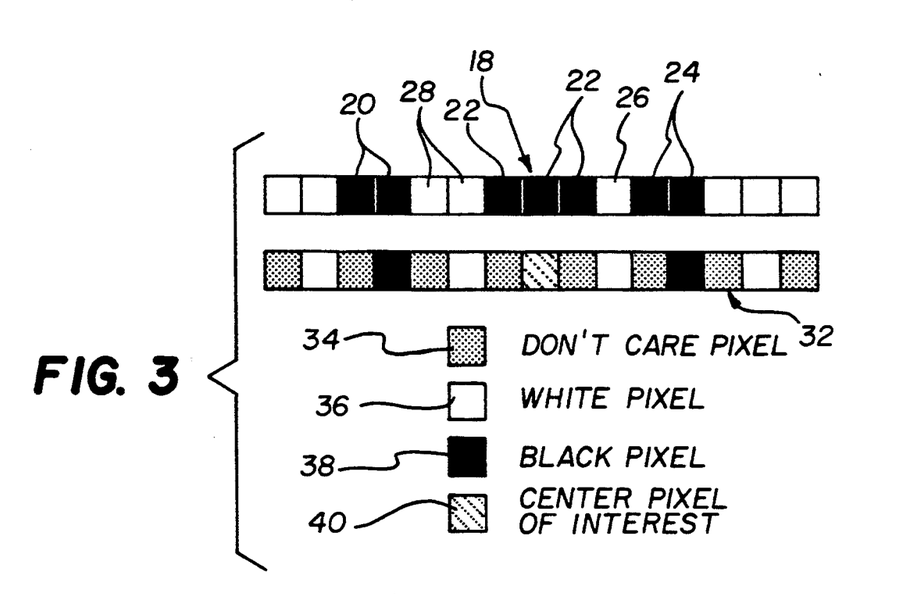
FIG. 3 is the horizontal bit pattern highlighted in FIG. 2.

The bit-pattern highlighted in box 18 in FIG. 2 is shown in FIG. 3. Note that there are three groups of black pixels 20, 22, and 24 separated by white pixels 26 and 28. In fact, by examining FIG. 2 closely (pixel by pixel) in all four predefined directions (horizontal, vertical, and left- and right-diagonal), eight sequences of pixels can be found with similar characteristics. The groups' characteristic bit-pattern can be generalized by the sequence of pixels shown in the characteristic bit-pattern 32 and is the bit-pattern used throughout this paper for detecting dot-matrix printed text. The lightly stippled pixels 34 represent don't care pixels in the kernal and indicate that that particular pixel is not used in determining the presence of dot-matrix printed text. The white pixels 36 are pixels in the kernel which represent the discontinuities 14 shown in FIG. 1A inherent to dot-matrix printed text. The black pixels 38 are the pixels in the kernel which represent the dots 12 that make up the dot-matrix printed character 10 of FIG. 1A. The cross-hatched center pixel 40 is the pixel of interest and represents the center of the pattern to be used for detection. All predefined direction patterns share a common center pixel of interest, pixel 40 (by necessity, this pixel must also be black). Similar bit-patterns can be implemented depending on x- and y-dot pitches and x- and y-scanning resolutions.

Figure 4:
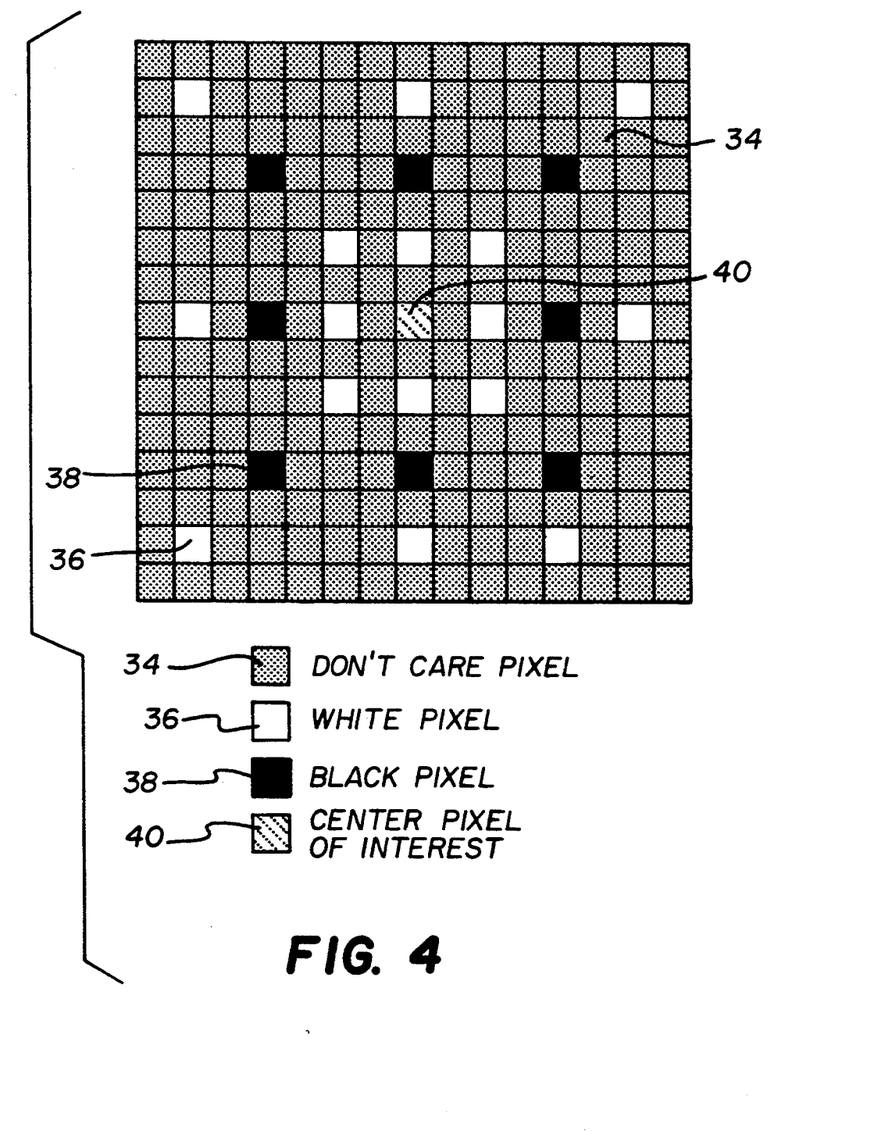
FIG. 4 is a two-dimensional representation of the generalized bit pattern of FIG. 3 expanded in the four directions, horizontal, vertical, and left- and right-diagonals.

By expanding this one-dimensional principle into two dimensions, a matrix of pixels can be created as shown in FIG. 4. The lightly stippled pixels ("don't care" pixels) 34 shown are pixels that do not contribute to the detection of dot-matrix characters. Note that the generalized one-dimensional bit-pattern in FIG. 3 is duplicated in the four directions (horizontal, vertical, left- and right-diagonals) of FIG. 4.

If a bit-pattern in the image data (about a center pixel of interest 40) of FIG. 4 matches the generalized bit-pattern of FIG. 3 in any of the four directions (i.e. each direction is evaluated independently for the given bit-pattern), then dot-matrix text is present about the center pixel of interest 40. For the bit-pattern defined above, the detector is scanning the character (or document) for three black pixels 38 (perhaps the centers of three dots from a dot-matrix printed character) separated by at least one white pixel 36 (the space between the dots) in any of the four predefined directions. The "don't care" pixels 34 show that neither the size of the dot nor the ratio of black to white pixels is important. The only requirement for detecting dot-matrix characters is that at least three black pixels 38, separated by white pixels 40, are arranged in a straight line in any of the four predefined directions within an area.

Figure 5:
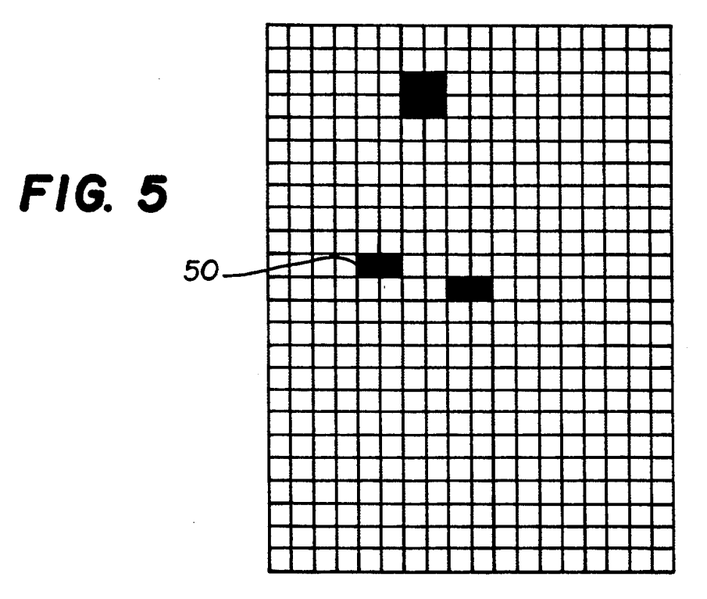
FIG. 5 is a map which illustrates the center pixels of interest about which dot-matrix printed text has been detected.

By scanning the bit-mapped image data (pixel by pixel), from left to right and top to bottom, for the desired bit-pattern and noting the locations of the center pixels of interest, an initial filter mask can be created which identifies the center pixels of interest 40 about which dot-matrix printed text has been detected as they relate to the original image. FIG. 5 shows this first step in creating the filter mask for the character shown in FIG. 2. Note that for this particular dot-matrix character, only 1.85% of the pixels have been determined to be dot-matrix center pixels 50 of interest. Yet this is enough information, as will be shown later, to filter the entire image of the character without affecting adjacent characters.

Figure 6:
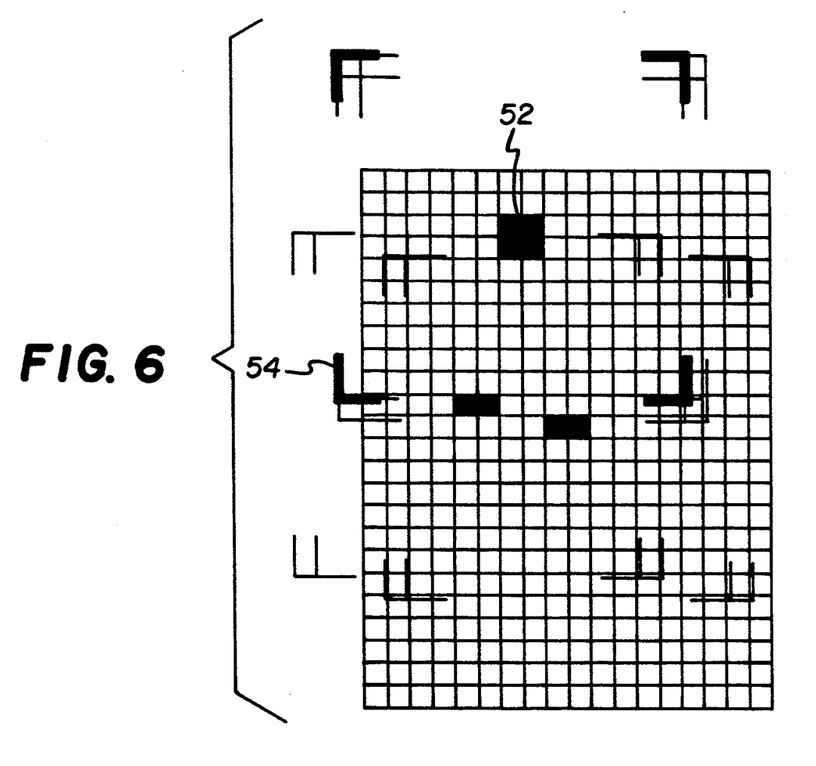
FIG. 6 illustrates the expanded 15×15 pixel regions about the center pixels of interest where dot-matrix printed text has been detected.

Referring to FIG. 6, once it has been determined where the dot-matrix center pixels of interest 52 are located, a two-dimensional region 54 about the center pixels of interest 52 can be drawn. For this particular example a 15×15 region 54 was used.

Figure 7:
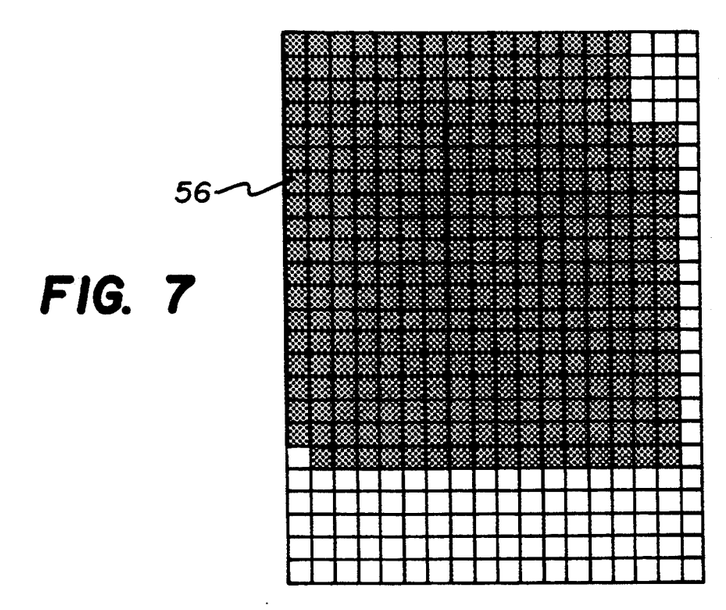
FIG. 7 is the filter mask to be used to process the video of FIG. 2.

From the bounding regions 54 of FIG. 6, the final filter mask can be created to include all pixels within the 15×15 regions 54 surrounding the center pixels of interest 52 that should be filtered. FIG. 7 illustrates what the filter mask 56 looks like after including the regions 54 which surround the center pixels of interest 52 in FIG. 6.

Figure 8A:
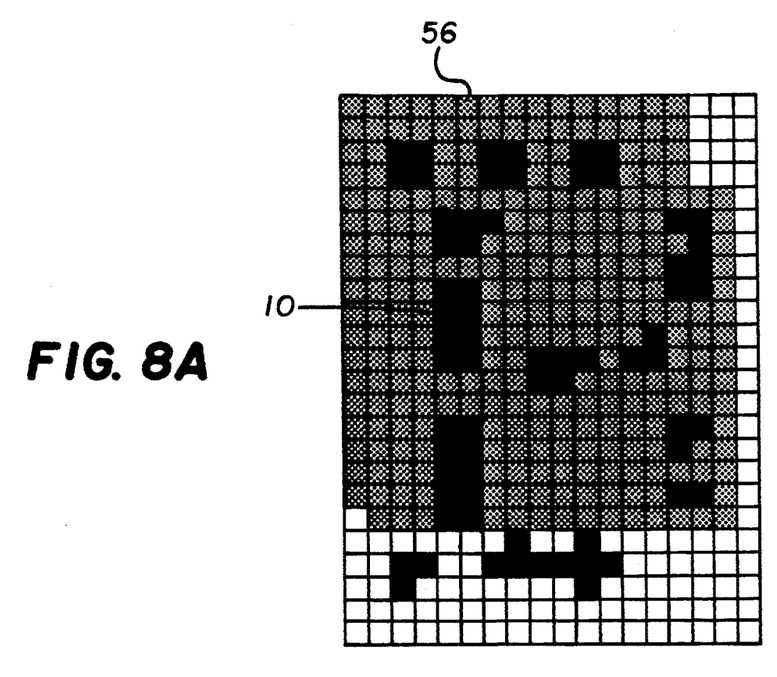
FIG. 8A shows the image of FIG. 2 overlaid by the filter mask of FIG. 7.
Figure 8B:
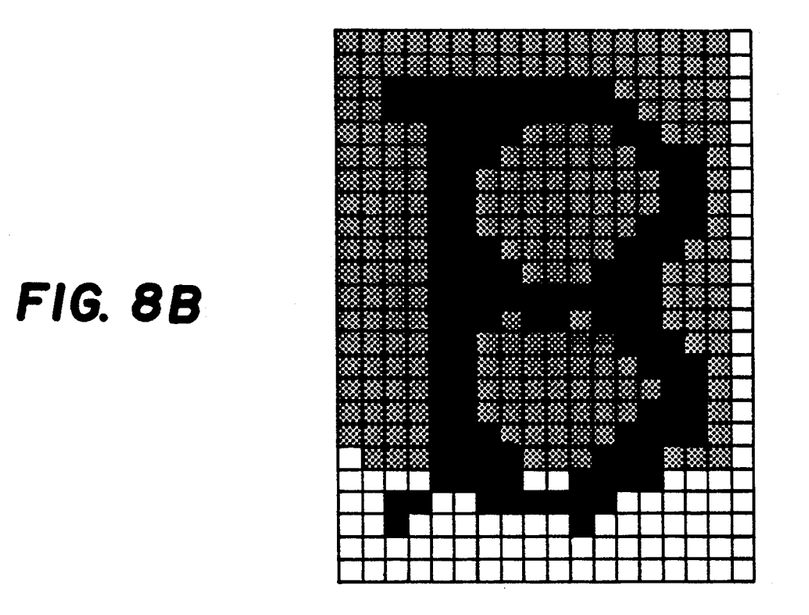
FIG. 8B shows the final image after applying the filter to the image of FIG. 2 with FIG. 7 as the bounding region.

By overlaying the image of FIG. 2 with the filter mask 56 of FIG. 7 as shown in FIG. 8, it becomes apparent which areas of the image are to be filtered and which areas shall remain unfiltered. In FIG. 8A, the shaded region represents the filter mask 56 and the area which will be processed by the filter. FIG. 8B illustrates the final filtered image.

The detection algorithm has been implemented with discrete logic circuits. In order to maximize throughput, the circuit has been designed to process the image data in real-time (i.e. at the full data rate of the scanning device).

Figure 9A:
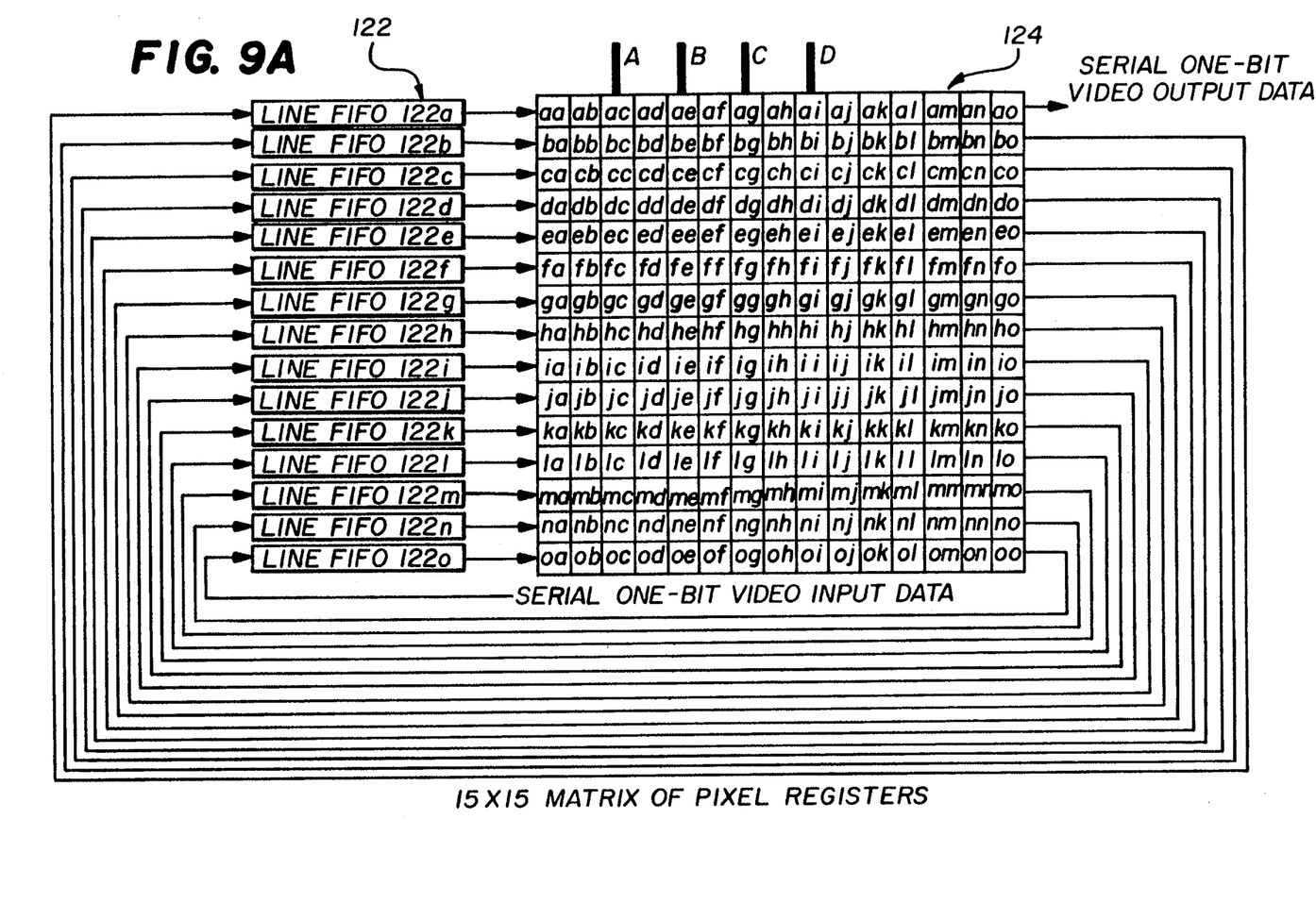
FIGS. 9A, 9B and 9C are block diagrams of the detection circuit for the hardware implementation.
Figure 9B:
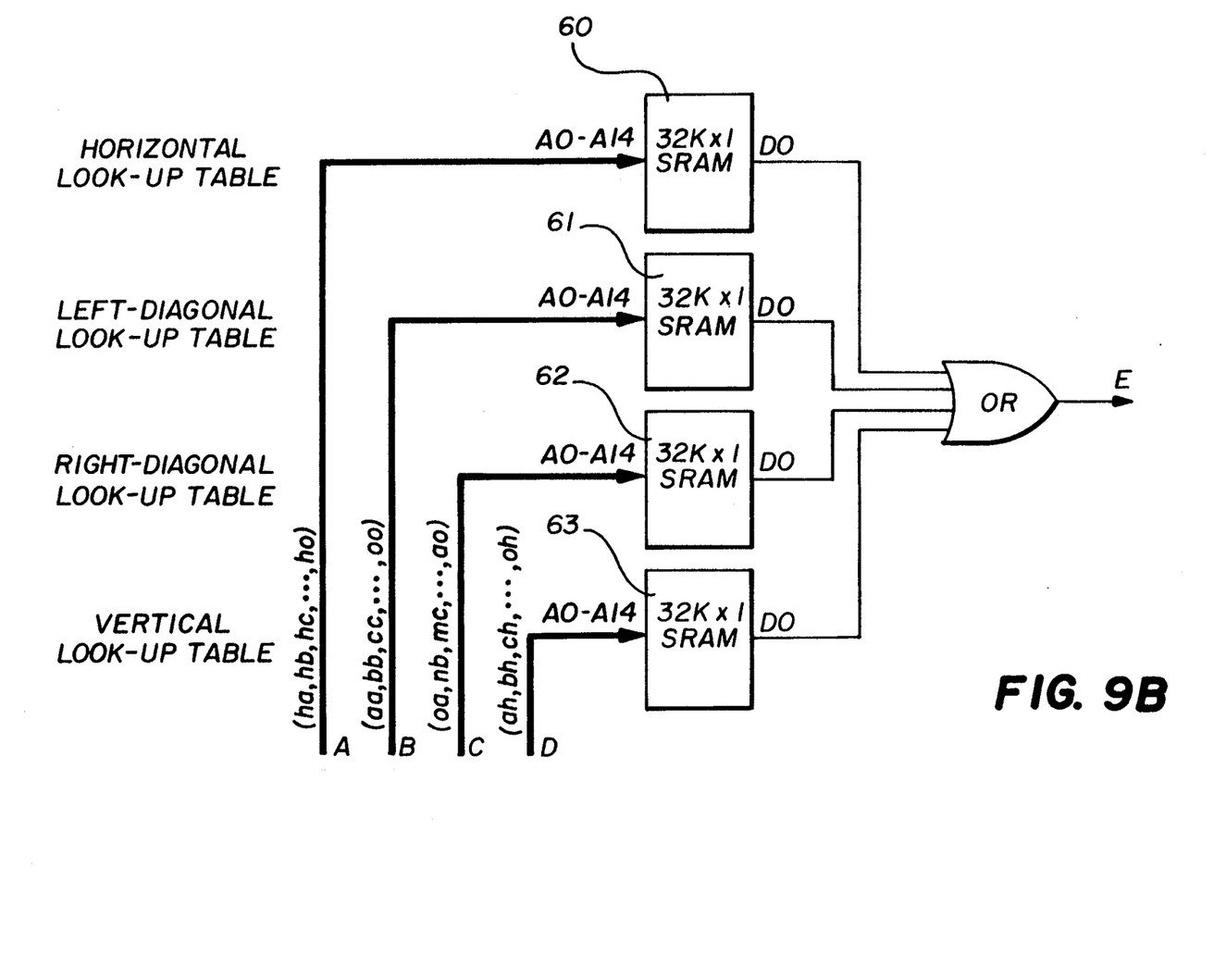
Figure 9C:
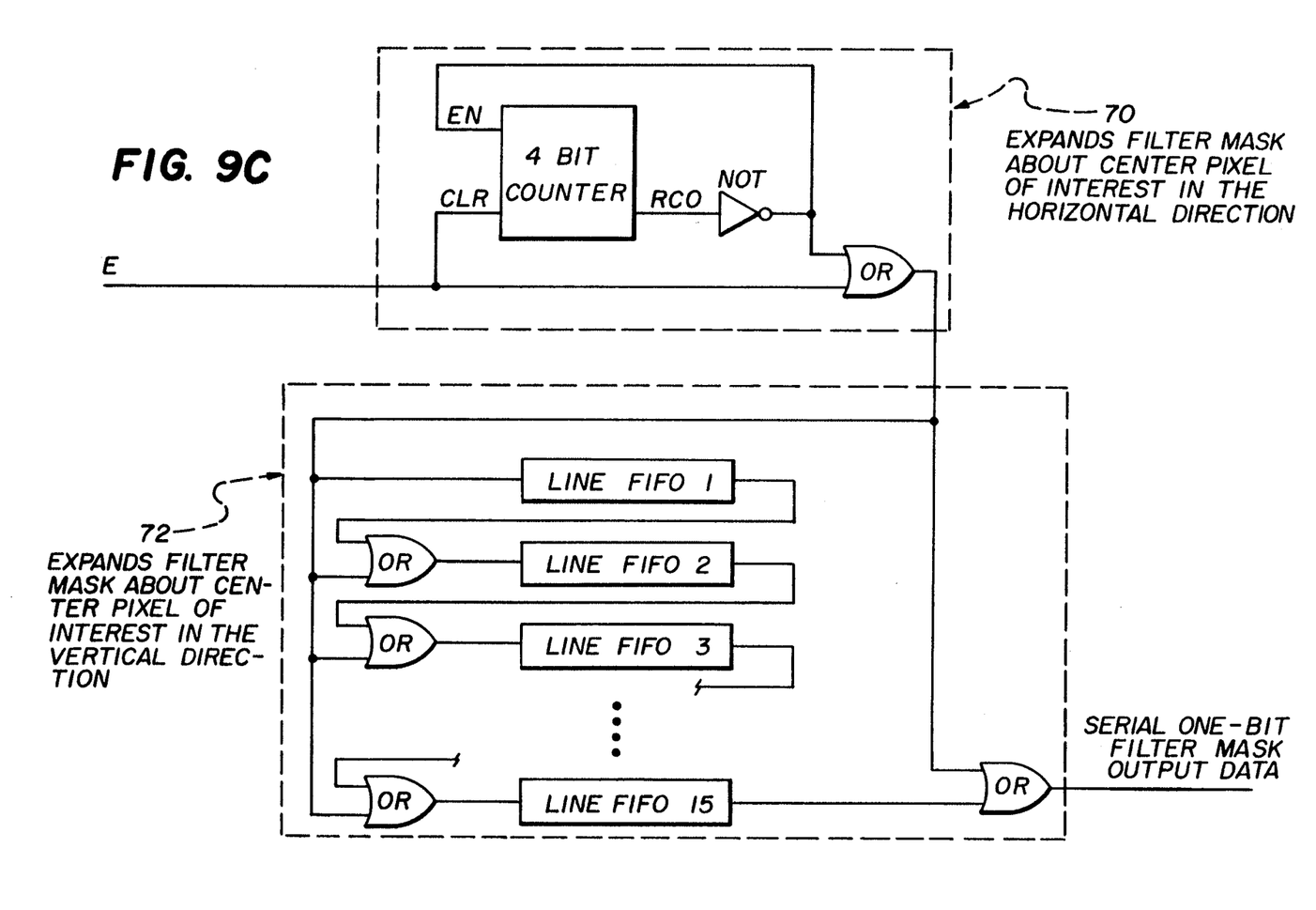

The hardware implementation of the detector circuit consists of four major sections as shown in FIGS. 9A, 9B, and 9C (1) the line store registers 122 for temporary storage of scan line data, (2) the look-up tables 60 used to examine the matrix and create the filter mask 56 of FIG. 8, (3) the 15×15 pixel register matrix 124, and (4) the circuit to expand about the center pixels of interest. In addition, an interface exists which allows the above three circuits to be linked to the microprocessor for downloading look-up table data and passing any control/status bytes from/to the microprocessor.

The process described above was presented in such a way that the 15×15 kernel could be thought of as being shifted across the bit-mapped image data to be examined. The hardware implementation of the present invention is done in the same way except that the bit-mapped image data can be thought of as being shifted across a stationary 15×15 kernel as described below.

However, before describing the circuit, a brief discussion of the transmission of image data is required. It should be understood that the binary image data is synchronously transmitted serially starting in the upper left-hand corner of the image. The data is transmitted to the circuit one pixel at a time from left to right across the scan line. Once a complete scan line has been transmitted, the next scan line is sent in the same format. Similarly, the output is serially transmitted on a pixel by pixel basis from left to right, and top to bottom.

Figure 10A:
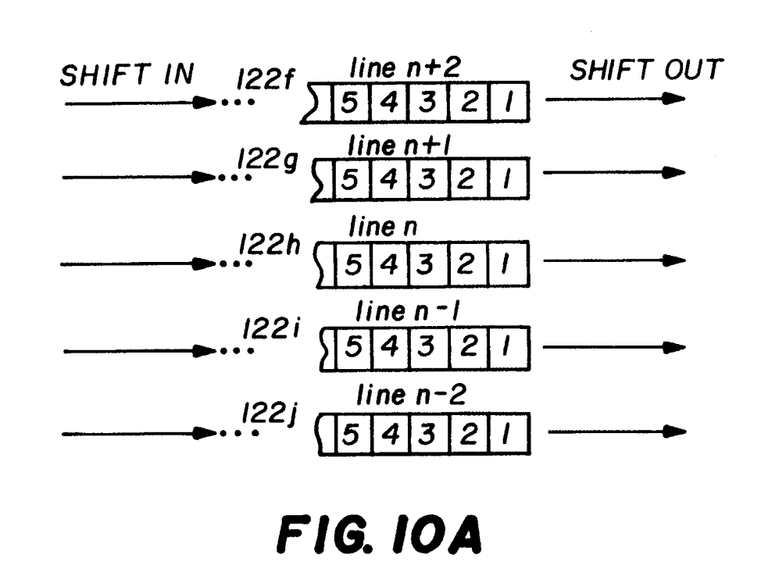
FIG. 10A illustrates the vertical alignment that is necessary by the line store registers of FIG. 9A.

The line store registers 122 of FIG. 9A consist of memory device(s) capable of storing M (vertical dimension of the 15×15 kernel 124) complete scan lines. Each line store register 122 is capable of shifting binary data in serially in such a way that the first pixel shifted in is the first pixel shifted out. A First In, First Out (FIFO) line buffer is such a device. Since a 15×15 kernel has been used throughout this document, 15 line store registers 122 are required for this embodiment. The purpose of the line store registers 122 is to maintain the vertical alignment of the scan lines being examined at any given time. In other words, the use of the line store registers 122 insures that the first pixel of a given scan line will be above or below the first pixel of the previous or next scan line, respectively. FIG. 10A shows the vertical alignment principle that is necessary. Pixel 1 of line n+2 is vertically aligned over pixel 1 of line n+1 which in turn is aligned with pixel 1 of line n.

FIG. 9A shows a 15×15 kernel 124. The kernel is a matrix of 225 D-type flip-flops arranged in such a way that the output of 124aa feeds the input of 124ab, 124ab feeds 124ac, and so on. Similarly, 124ba feeds 124bb, 124bb feeds 124bc, etc.

The line store register's 122o output feeds the kernel element 124oa and eventually feeds line store register 122n via the 15×15 kernel 124. Likewise, line store register 122n feeds the kernel element 124na which in turn feeds line store register 122m and so on. In the case of the last line store register 122a, the output feeds the kernel 124aa. The output of the kernel 124ao is then used as the output of the circuit rather than input to another line store register.

Figure 10B:
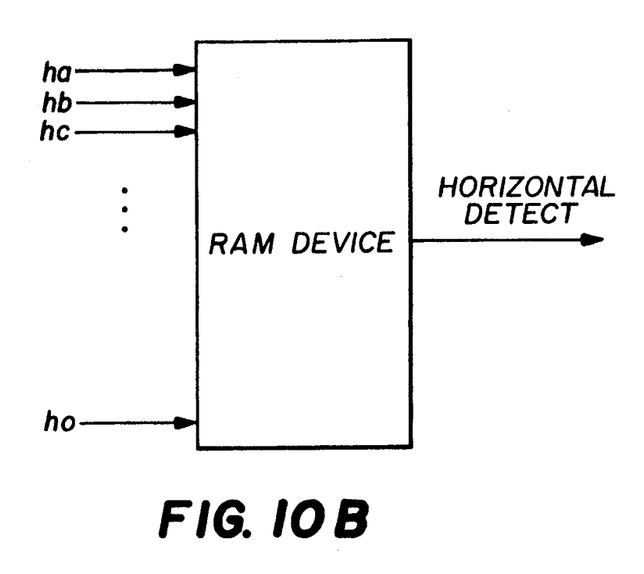
FIG. 10B illustrates the RAM look-up tables and how they are implemented.

A block diagram of the horizontal look-up table 60 is shown in FIG. 9B. A Random Access Memory (RAM) device can be used for the look-up table 60. The output of each kernel element 124ha–124ho is used as an address bit to the horizontal RAM device. FIG. 10B illustrates the implementation detail of using a RAM device as a look-up table. Similarly, the other directions are handled with independent RAM devices. The four RAM devices corresponding to the four predefined directions are then OR'ed together effectively searching for the desired bit pattern in any of the four directions. The output of this section corresponds to FIG. 5.

The expander circuit of FIG. 9C is used to expand the filter mask about the center pixel of interest. Sub-circuit 70 expands in the horizontal direction. Whenever a center pixel of interest is identified as a dot-matrix center, this circuit expands it in the horizontal direction to 15 pixels.

Sub-circuit 72 then expands this horizontal mask in the vertical direction by 15 lines. Upon completion of this two-dimensional expansion, a filter mask is generated which corresponds to that shown in FIG. 7.

Advantages and Industrial Applicability

The method and apparatus of the present invention is intended to improve OCR read rates of dot-matrix printed text without significantly affecting typewritten text. Specifically, the algorithm examines the binary image data and determines whether discontinuities exist in character image data. It has been found through experimentation that the bit pattern shown in FIG. 4 works well for dot-matrix printed characters scanned at 200 dots per inch.

By properly programming the detection RAM banks, it may be possible to search for any other bit-patterns. Perhaps it would be desirable to detect discontinuities in line art that has been digitized.

What is claimed is:

1. A method of detecting the presence of dot-matrix printed text from other types of printed text in an image by processing bi-level pixel video data of text characters, comprising the steps of:

locating a kernel of M rows by N columns of pixels to a location in said image;

moving said kernel to the next adjacent pixel position and examining the image data contained in the kernel and labeling those pixel positions with a flag when the bit pattern at the current location matches one or more of the following bit patterns:

(a) where there are one or more adjoining black pixels in a column forming a group of three vertical groups of black pixels in the same column are separated from adjacent groups by at least one white pixel in the column;

(b) where there are one or more adjoining black pixels in a row forming a group and three horizontal groups of black pixels in the same row are separated from adjacent groups by at least one white pixel in the row;

(c) where there are one or more adjoining black pixels in a given left-diagonal forming a group and three groups of black pixels along said given left-diagonal are separated from adjacent groups by at least one white pixel along the same left diagonal;

(d) where there are one or more adjoining black pixels in a given right-diagonal forming a group and three groups of black pixels along said given right-diagonal are separated from adjacent groups by at least one white pixel along the same right-diagonal; and when any of the above patterns are found, creating and outputting a filter mask of M rows by N columns that is indicative of the location of dot matrix text in the image.

2. A method as set forth in claim 1 wherein the white pixels are used in place of the black pixels and black pixels are used in place of white pixels.

3. An apparatus for detecting the presence of dot-matrix printed text from other types of printed text in an image by processing the bi-level pixel video data of text characters, aid apparatus comprising:

means for scanning said image to provide bi-level pixel video data of text characters;

means for locating a kernel of M rows by N columns to a location in said image data;

means for moving said kernel to the next adjacent pixel position and labeling those pixel positions with a flag when the bit pattern at the current location matches one or more of the following bit patterns:

(a) where there are one or more adjoining black pixels in a column forming a group and three vertical groups of black pixels in the same column are separated from adjacent groups by at least one white pixel in the column;

(b) where there are one or more adjoining black pixels in a row forming a group and three horizontal groups of black pixels in the same row are separated from adjacent groups by at least one white pixel in the row;

(c) where there are one or more adjoining black pixels in a given left-diagonal forming a group and three groups of black pixels along said given left-diagonal are separated from adjacent groups by at least one white pixel along the same left diagonal;

(d) where there are one or more adjoining black pixels in a given right-diagonal forming a group and three groups of black pixels along said given right-diagonal are separated from adjacent groups by at least one white pixel along the same right-diagonal; and means for generating and outputting a filter mask M rows by N columns that is indicative of the location of dot matrix text in said image.

4. An apparatus as set forth in claim 3 wherein the white pixels are used in place of the black pixels and the black pixels are used in place of the white pixels.

* * * * *